July 29, 1969   C. T. FLACHBARTH ET AL   3,458,182
BOAT TRAILER FIXTURES
Filed Jan. 17, 1966   3 Sheets-Sheet 2
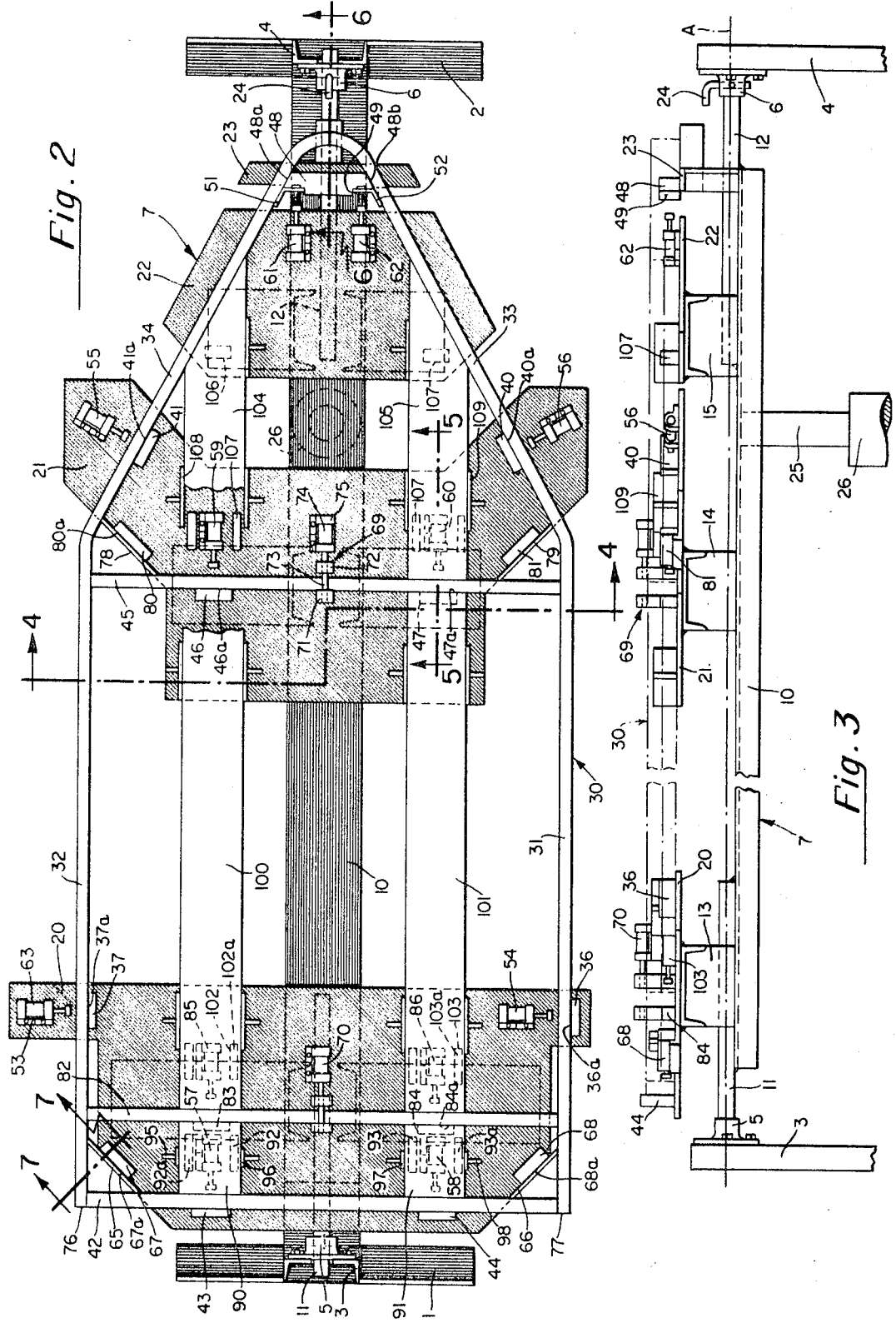

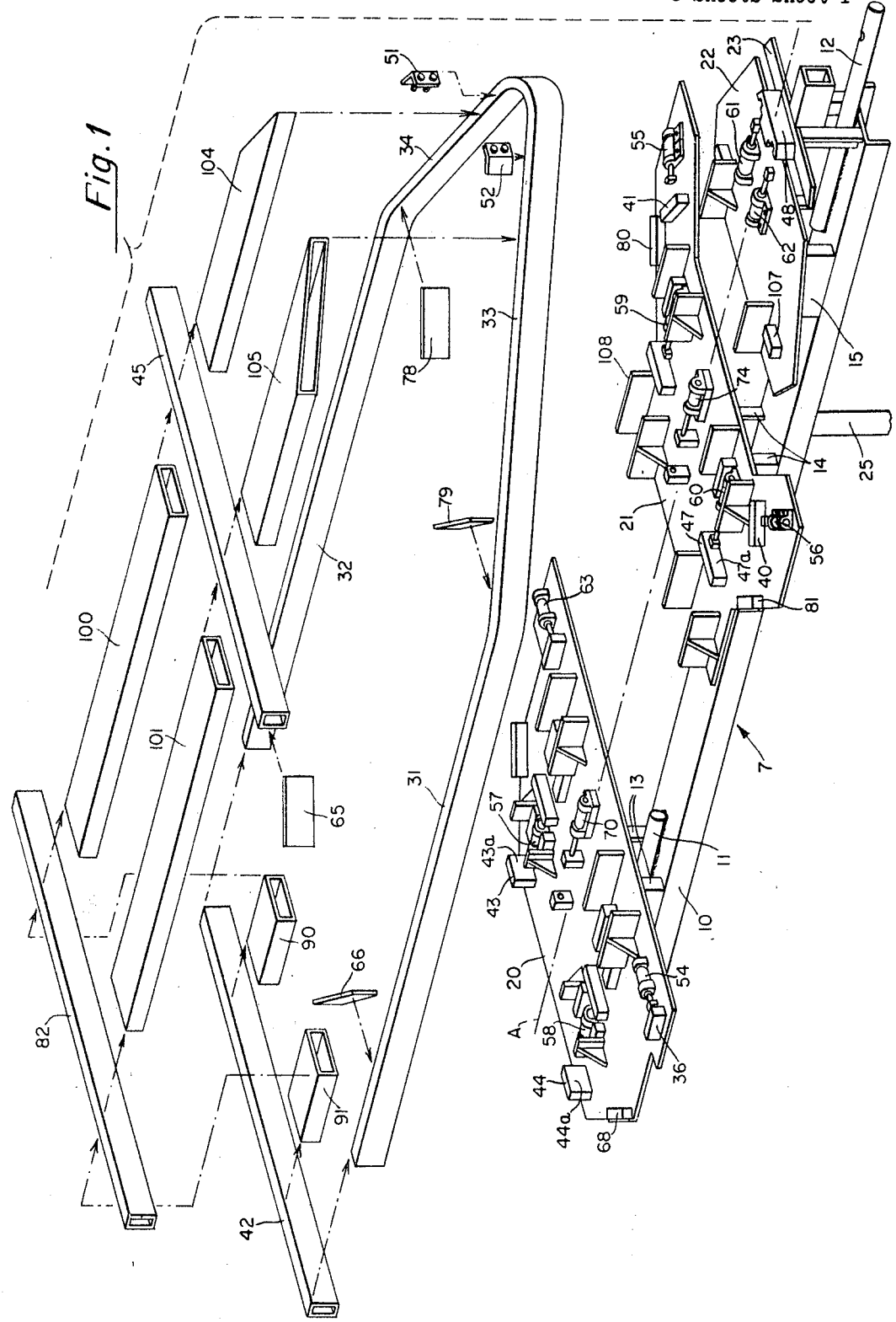

United States Patent Office 3,458,182
Patented July 29, 1969

3,458,182
BOAT TRAILER FIXTURES
Charles T. Flachbarth and Ronald S. Friedman, Parkersburg, W. Va., assignors to Textron, Inc., Providence, R.I., a corporation of Rhode Island
Filed Jan. 17, 1966, Ser. No. 521,123
Int. Cl. B23q *3/08;* B25b *1/20*
U.S. Cl. 269—25                                   5 Claims

ABSTRACT OF THE DISCLOSURE

A fixture for assembling small boat trailers, the fixture having mechanism for accepting, locating and locking trailer components in position for welding and the mechanism being adapted to hold parts for trailers of various load capacities.

---

This invention relates to fixtures for use in assembling boat trailers, particularly boat trailers of the kind disclosed in our copending application Ser. No. 519,494, filed Jan. 10, 1966 and entitled Improvements in Boat Trailers now Patent 3,403,798.

The principal object of the invention is to provide boat trailer assembly fixtures having structure for accepting, locating, and locking various trailer components in position for uniting together as by welding.

Another object of the invention is to provide a trailer assembly fixture including a unitary platform means provided with various holding and locating mechanisms adapted to simultaneously hold a relatively large number of trailer parts in condition so that the same can be quickly welded together and thereby eleminate a variety of jigs and fixtures that might otherwise be necessary for the assembly operation.

Another object of the invention is to provide a trailer assembly fixture constructed and arranged to locate and hold a variety of trailer parts in position for welding, the fixture being especially configured for minimum number of operators to locate the trailer parts and to effect the welding.

Another object of the invention is to provide a trailer assembly fixture of the kind in question constructed of especially designed components which are readily adaptable in various sizes and configurations to provide for a family of fixtures particularly suitable for the fabrication of a family of boat trailers having certain common characteristics enhancing the functional and operational abilities of the trailer.

Another object of the invention is to provide a trailer assembly fixture of the kind in question constructed of components for locating and holding the trailer parts, the fixture components being of relatively simple geometric shape and form so as to be capable of being fabricated of conventional stock.

Another object of the invention is to provide a trailer assembly fixture of the kind in question comprised of components which are constructed and arranged to eliminate the necessity of machined surfaces for the locating and holding function.

Another object of the invention is to provide a trailer assembly fixture of the kind in question having structure for accepting and locating hollow, rectangular shaped tubular trailer parts in position for welding from the top side of the fixture and then quickly rotatable to a position wherein the components can be welded from the underside of the fixture.

Another object of the invention is to provide a trailer assembly fixture of the kind in question having components for locating the various trailer parts, the fixture components being constructed and arranged so that the trailer parts can be dropped into place on the fixture and then automatically lock in position by piston and cylinder means holding the parts against locating surfaces.

The nature and details of the invention will be described below in connection with the following drawings:

FIGURE 1 is a composite perspective view showing a typical trailer fixture and above the fixture there being an exploded view of certain of the trailer components used in the fixture.

FIGURE 2 is a plan view of the fixture of FIGURE 1 and the trailer parts thereon.

FIGURE 3 is the side elevational view of the fixture of FIGURE 1.

Figure 4:
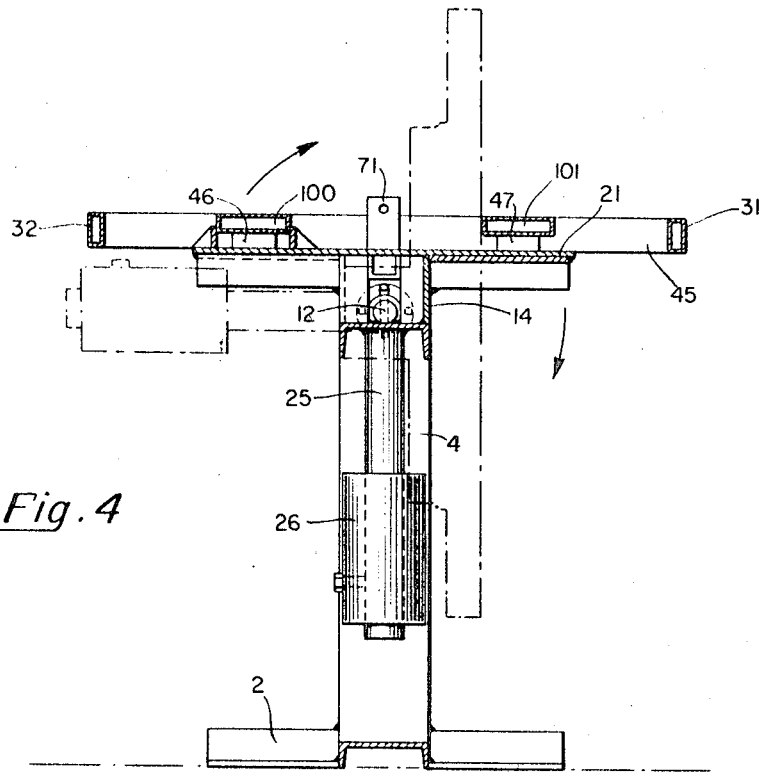
FIGURE 4 is a view taken along the lines 4—4 of FIGURE 2.
Figure 5:
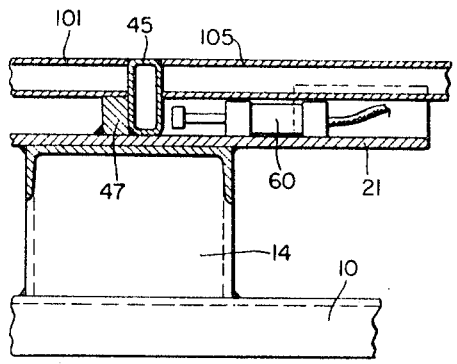
FIGURE 5 is a view taken along the lines 5—5 of FIGURE 2.
Figure 6:
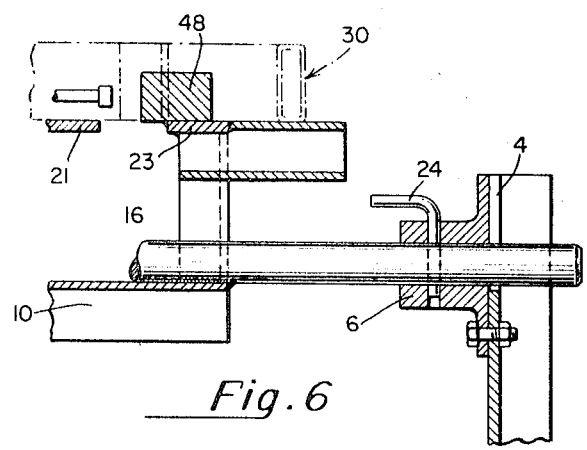
FIGURE 6 is a view taken along the lines 6—6 of FIGURE 2.

Referring to FIGURES 2 and 3, base members 1 and 2 support upright standards 3 and 4 respectively mounting the bearings 5 and 6, which support the fixture platform means 7 for rotation about the axis A.

An alongated channel 10 has a pair of axles 11 and 12 respectively welded adjacent opposite ends. The axles are supported in the bearings 5 and 6. Extending upwardly from the channel member 10 are the risers 13, 14, 15, and 16, which respectively carry wing members 20, 21, 22, and 23.

The wing members 20 through 23 carry structure which is adapted to receive various parts of the trailer and to locate these parts in position for welding. For the most part, the welding operation is carried out with the platform in the position shown in FIGURES 2 and 3; i.e., with the wings extending horizontally. Some of the trailer parts, however, requires a welding operation which must be effected from the underside, and for this operation it is contemplated that the platform be turned about the axis A approximately 90° or as shown in FIGURE 4, where it will be seen that the plaform means 7 extends generally vertically so that the underside is available to the operator. In some instances the fixture is turned 180° for the welding operation.

For securing the platform in either of the above mentioned rotatable positions we have provided apertures in the axle 12 and bearing 6 which when aligned will accommodate a lock pin 24.

To assist in moving the platform and the parts of the trailer thereon as between the two rotational positions we have included counterweight means.

As shown, the counterweight means includes a post 25 connected to the channel 10. A weight 26 is adjustably mounted on the post. The counterweight and its connected parts provide a means on one side of the axis for substantially counterbalancing the mass formed by the fixture components and trailer parts on the opposite side of the axis. The weight 26 is adjustable to provide for the correct balancing effect.

The fixture shown in the drawings is of a size for use in the assembly of trailers of the kind illustrated in FIGURE 4 of our copending application. These trailers carry larger size boats. By varying the dimensions of the fixture components and by the elimination of certain locating surfaces, the structure of the fixture shown in the drawings is readily adaptable to a size commensurate with a boat trailer of smaller capacity. Thus, in the material below we will first describe the structure of a fixture for use in the assembly of a small capacity trailer such as shown in FIGURE 1 of our copending application. For this purpose assume that the dimensions of the fixture components are of a size corresponding to such a trailer.

The invention contemplates that the various parts of the trailer be dropped into place against locating surfaces on the fixture platform and then, when all the parts are located, hydraulic or pneumatic mechanisms are actuated to clamp the parts in position. Thus, the components of the fixtures of the invention will be described in connection with the trailer parts being put into the fixture.

In FIGURE 1 the numeral 30 indicates a trailer frame part comprising the side sections 31 and 32, the leg sections 33 and 34, and apex area 35. The part 30 is adapted to be placed on the fixture and located and locked in position as follows:

The wing 20 has a pair of side blocks 36 and 37. The wing 21 has leg blocks 40 and 41. The side blocks 36 and 37 are respectively provided with vertically extending locating surfaces; the locating surface for the block 36 is indicated at 36a and the locating surfaces for the block 37 is indicated at 37a. These locating surfaces extend parallel the axis A as shown in FIGURE 2.

The leg blocks 40 and 41 also have locating surfaces. The locating surface for the block 40 is indicated at 40a and the locating surface for the block 41 is located at 41a. These locating surfaces are oriented at an acute angle with respect to the axis A as indicated in FIGURE 2.

When the trailer part 30 is placed on the fixture the side sections 31 and 32 are respectively located in a transverse direction as by the locating surfaces 36a and 37a. The top side of the platform or wing 20 locates the side sections 31 and 32 in a vertical direction.

The leg sections 33 and 34 of the trailer are located by the surfaces 40a and 41a. The top side of the platform of wing 21 locates the leg sections in a vertical direction. The locating surfaces 40a and 41a also locate the part 30 along the axis A.

After the part 30 of the trailer frame is in place, the rear keel member 42 is placed on the fixture. The rear keel member is located axially and transversely as by the locating surfaces 43a and 44a of the rear keel blocks 43 and 44 disposed on the wing 20. The locating surfaces 43a and 44a extend generally normal to the axis A. The top side of the platform on the wing 20 locates the rear keel member vertically.

The forward keel member 45 is then placed on the fixture. This keel member is located axially and transversely as by the locating surfaces 46a and 47a of the forward keel blocks 46 and 47 and is located vertically as by its engagement on the platform on wing 21.

While the above described locating surfaces are sufficient for desirably positioning the trailer parts on the fixture, we also make use of additional locating means. As shown in FIGURE 2 this takes the form of an abutment 48 connected with the wing 23 and having locating surfaces 48a and 48b which are oriented transversely of the axis A and are co-planar with the locating surfaces 40a and 41a.

The abutment 48 is also provided with vertically extending locating cavities generally indicated at 49 and 50. The cavities 49 and 50 are adapted to locate the roller brackets 51 and 52 for welding to the apex area. These brackets are of the same structure as described in connection with FIGURE 10 of our copending application.

The part 30 and the rear and forward keel members are adapted to be locked in position as by conventional piston and cylinder devices 53, 54, 55, 56, 58, 59, and 60. The devices 61 and 62 lock the bracket 51 and 52 in the cavities 49 and 50. All of these devices are of identical construction and for descriptive purposes reference will be made to the device 53. This includes the cylinder 63 carrying a piston extension which is indicated at 64. Fluid is introduced in the cylinder in a manner to cause the piston to move away from the locating surface 37a and thus provide a space to accommodate the side section 32. Then fluid is introduced in a manner to move the piston toward the locating surface 37a. When the piston so moves, it engages side section 32 and clamps the same tightly against the locating surface.

Figure 7:
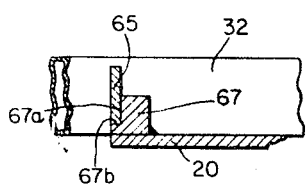
FIGURE 7 is a view taken along the lines 7—7 of FIGURE 2.

Next the rear stiffener members 65 and 66 are placed in position. These are located by stiffener blocks 67 and 68 mounted on the wing 20. As best seen in FIGURE 7 the block 67 has locating surfaces indicated at 67a and 67b which respectively locate the stiffener transversely and vertically. The block 68 has similar surfaces supporting the rear stiffener member 66. As will be noted, the stiffeners are located between the rear keel member and the side sections 31 and 32.

After all of the components have been placed in the fixture as above described, the various piston and cylinder devices are actuated so that each piston will move up and engage its frame component and lock the same against the locating surface. The piston and cylinder devices 61 and 62 lock the brackets 51 and 52 in the locating cavities.

The invention contemplates the use of clamping mechanisms such as the clamping mechanisms 69 and 70 to provide a positive means to hold the trailer frame against the fixture when the same is rotated for underside welding. The clamps are identical and are adapted to be actuated at the same time as the piston and cylinder devices 53–62. The clamps are described below.

The clamp 69 includes the apertured posts 71 and 72 secured to the wing 21. The posts receive a bolt 73 which is adapted to be moved back and forth by the piston 74 of the piston cylinder device 75. In the position shown the bolt 73 has been moved by the piston so that it is received by the apertures in the posts and engages the top surface of the forward keel member 35. When the bolt is withdrawn it provides for a free space as between the posts. The piston and cylinder device 75 is adapted to be actuated at the same time as the other piston and cylinder devices. When the bolt is in the engagement position it makes it impossible for the trailer frame (after it is welded) to separate from the fixture even though the fixture may be turned 180°.

With the above-described trailer parts desirably located on the fixture the same are in condition for being secured together as by welding. As will be apparent the platform orients the various trailer parts so that they extend generally horizontal. Further, it will be apparent that there is complete freedom of access to the trailer parts from the top side of the platform. Thus an operator can weld up the keels members to the side sections. The welds for the keel members 42 and 45 are effected across the top surface and down each vertical edge. The welds for the stiffeners 64 and 65 are effected along the vertical line of engagement. The roller brackets 51 and 52 are welded respectively to the inside of the legs 33 and 34, the welding being effected down the side of each bracket.

After the above described welds are made, the lock pin 24 is removed and the platform rotated 90° to the position as shown in FIGURE 4 and the lock pin 24 reinserted to hold the platform in position. Welds then are effected on the underside of the forward and rear keel members. The fixture is then rotated back to the horizontal position.

The various locating surfaces and the top of the platform cooperate to position the top surfaces of the side sections 31 and 32, the leg sections 33 and 34, and the top surfaces of the rear keel member 42 and forward keel member 35 all substantially flush or co-planar. Depending upon the nature of the weld made at the top of the juncture of the keel members and the side sections, a grinding operation may be effected to present a smooth top surface.

Having effected all of the weldings above described, the piston and cylinder devices are actuated so as to relieve the piston contact with the various trailer parts, and then the frame is lifted out of the fixture. The frame is now ready for the next operation in the manufacture of the trailer.

As will be apparent from the description to this point, the type of frame covered is for use in the assembly of trailers of the kind shown in FIGURES 1, 2, and 3 of our copending application. Ordinarily there is a difference in length of parts as between the different size trailers; for example, a difference in length in the side sections and leg sections. In some instances there may be differences in trailer width. Where this occurs, the fixtures described above can be readily made up to suit the particular trailer design simply by expanding or contracting the width of the various components.

In those instances where the fixture is adapted for use in constructing trailer frames of the kind shown in FIGURE 3 of our copending application, it is contemplated that the bridge assemblies used on the side sections be welded on while the fixture is in the horizontal position. Ordinarily the ends of the bridge assemblies are flattened down to an extend that the same can be placed on the top surface of the side section and remain in the upright position while one end is tack welded. The complete welding of the assembly is then carried out.

As mentioned heretofore, the fixture assembly shown herein is adapted particularly for trailer frames of the kind shown in FIGURE 4 of our copending application, and for the various additional parts which are incorporated in such a trailer frame we have provided locating structures on the fixture. These will be described below.

For the forward stiffener members 78 and 79 we have provided stiffener blocks 80 and 81 on wing 21. These blocks have locating surfaces similar to the locating surfaces on the block 67 which respectively locate the forward stiffeners 74 and 75 transversely and vertically.

For the intermediate keel member 82 the fixture has intermediate locating blocks 83 and 84 mounted on the wing 20 and having locating surfaces 83a and 84a. The locating surfaces 83a and 84a are oriented generally normal to the axis A. The top of the platform or wing 20 locates the intermediate keel member in a vertical direction. The piston cylinder devices 85 and 86 are utilized to lock the intermediate keel member 82 against the locating surfaces. The devices 85 and 86 have the same construction and are operated similarly as the piston and cylinder devices described above.

For the rear walk boards 90 and 91 disposed between the rear keel member 42 and intermediate keel member 83 the platform includes walk board blocks generally indicated at 92 and 93. As shown, the blocks 92 and 93 have three separate parts disposed around the piston and cylinder devices 57 and 58. The blocks have locating surfaces 92a and 93a which are oriented generally normal to the locating surfaces on the blocks 43, 44, etc. The locating surfaces 92a and 93a support the walk boards 90 and 91 so that their top surfaces are flush with the top surfaces of the keel members 42 and 82.

The walk boards 90 and 91 are located transversely of the axis A by the upright arm means 95 and 96 mounted on the wing 20. The walk board 90 is similarly located by the upright arm means 97 and 98 on the wing 20.

The midsection walk boards 100 and 101 which extend between the intermediate keel member 82 and the forward keel member 45 are located on a vertical direction between walk board blocks 102 and 103 (left-hand side) which have locating surfaces 102a and 103a similar to the surfaces 92a and 93a. On the right-hand side the top surfaces of the blocks 46 and 47 serve as locating surfaces for the walk boards 100 and 101. Vertical arm means 103 respectively locates the walk boards 100 and 101 transversely. The walk boards 104 and 105 which extend between the forward keel member 45 and the legs 33 and 34 are positioned vertically by the walk board locating blocks 106 and 107 and transversely by the arms 108 and 109.

After the forward stiffeners, the intermediate keel member, and the various walk boards are positioned, the welding is carried out. The stiffeners and keel members are welded as described for the rear stiffeners and the rear keel member. The walk boards are welded across the top at the junctures between the boards and the keel members and legs, and then a weld is placed down each side.

The trailer frame shown in FIGURE 4 of our copending application has bridge bar assemblies and these are welded on when the fixture is in the horizontal position. Also the trailer in FIGURE 4 is provided with an underslung keel member which is welded to the walk boards by rotating the fixture 180° from the horizontal, positioning the underslung member on the underside of the walk boards and then performing the welding operation.

We claim:

1. In a fixture to support side sections, leg sections, forword and rear keel members, and rear stiffener members of a trailer frame for welding, the combination comprising:

a horizontally extending channel having an axis;

means respectively adjacent opposite ends of the channel for supporting the channel in a horizontal position;

a plurality of wing members disposed above and connected to said channel and extending transverse to said axis, the wing members constituting a horizontally extending, elongated platform having an axis;

a pair of side blocks on said platform, the side blocks being spaced from one another respectively on opposite sides of the axis, each of said side blocks having a planar, vertically extending side locating surface and each side locating surface being parallel to the axis of the platform means and facing outboard;

a pair of leg blocks on said platform, the leg blocks being spaced from one another on opposite sides of said axis inboard of said side blocks, each leg block having a planar, vertically extending leg locating surface and the leg locating surfaces being oriented at an acute angle with said axis and facing outboard, said side locating surfaces cooperating with the platform for locating the side selection of a trailer frame and said leg locating surfaces cooperating with the platform to locate the leg sections of a trailer frame;

a pair of rear keel blocks on said platform, the rear keel blocks being spaced from one another respectively on opposite sides of said axis, each block having a planar, vertically extending locating surface oriented generally normal to said axis, and facing inboard, the locating surfaces cooperating with said platform means to locate a rear keel member between said side sections adjacent the ends thereof;

a pair of forward keel blocks on said platform, the forward keel blocks being spaced from one another respectively on opposite sides of said axis, each keel block having a planar, vertically extending locating surface oriented generally normal to said axis and facing outboard, the locating surfaces cooperating with said platform to locate a forward keel member between the side sections of a trailer frame;

for each said locating surface piston and cylinder means, each piston thereof being adapted to move in a direction away from the locating surface to provide a space to accommodate the corresponding trailer frame part and to move in a direction toward the locating surface to lock the part against the locating surface and said platform locating the side sections, the leg sections and the keel members with their top surfaces substantially co-planar; and a pair of rear stiffener blocks on said platform, the stiffener blocks being spaced from one another respectively on opposite sides of said axis, each block having a pair of intersecting locating surfaces respectively extending horizontally and vertically to locate and support a rear stiffener member against a rear keel member and a side section of a trailer frame.

2. A construction in accordance with claim 1, further including a pair of intermediate blocks on said platform, the intermediate blocks being spaced from one another on opposite sides of said axis and each intermediate block having a planar, vertically extending locating surface oriented generally normal to said axis, the intermediate locating surfaces cooperating with said platform to locate and support an intermediate cross member between trailer frame side sections and for each side intermediate locating surface a piston and cylinder device, each piston being adapted to move away from its locating surface to provide a space for accommodating said intermediate keel member and to move toward the intermediate locating surface to lock the keel member against the locating surface and the platform locating the cross member with its top surface co-planar with the top surfaces of said side members.

3. A construction in accordance with claim 2, further including a first pair of walk board blocks on said platform, the blocks being spaced from one another respectively on opposite sides of said axis, each block having a planar, horizontally extending locating surface and adapted to support a walk board between said rear keel member and said intermediate keel member with the top surface of the walk board substantially flush with the top surfaces of the keel members;

a second pair of walk board blocks on said platform, the blocks being spaced from one another respectively on opposite sides of said axis, each block having a planar, horizontally extending locating surface adapted to support a walk board between said forward keel member and said intermediate keel member with the top surface of the walk board substantially flush with the top surfaces of the keel members;

a third pair of walk board blocks on said platform, the blocks being spaced from one another respectively on opposite sides of said axis, each block means having a planar, horizontally extending locating surface to support a walk board between the forward keel member and leg section with the top surface of the walk board substantially flush with the top surfaces of the keel member and said leg section; and arm mechanism on said platform respectively disposed adjacent each of said pairs of walk board blocks for engaging the sides said walk boards when disposed on said locating surfaces for locating the walk boards transversely of said axis.

4. A construction in accordance with claim 2, further including a pair of forward stiffener blocks on said platform, the stiffener blocks being spaced from one another respectively on opposite sides of said axis, each block having a pair of intersecting locating surfaces respectively extending horizontally and vertically to locate and support a trailer frame forward stiffener member against the intermediate keel member and the leg section of a trailer frame.

5. A construction in accordance with claim 1 further including means forming a pair of locating cavities respectively disposed on opposite sides of said axis, each cavity being formed to receive and locate roller bracket means; a pair of piston and cylinder devices on said platform and respectively disposed on opposite sides of said axis adjacent said cavities, each piston being adapted to move away from its cavity to provide a space for insertion of a roller bracket in the cavity and to move toward the cavity to lock the bracket therein.

References Cited

UNITED STATES PATENTS

| | | | |
|---|---|---|---|
| 1,755,031 | 4/1930 | Schmuckler | 269—45 X |
| 3,030,988 | 4/1962 | Patterson | 269—321 |
| 3,243,177 | 3/1966 | Christman | 269—321 |

FOREIGN PATENTS

| | | |
|---|---|---|
| 132,668 | 6/1949 | Australia. |

LESTER M. SWINGLE, Primary Examiner

DAVID R. MELTON, Assistant Examiner

U.S. Cl. X.R.

269—41